US008060494B2

(12) United States Patent  
Seide et al.

(10) Patent No.: US 8,060,494 B2
(45) Date of Patent: Nov. 15, 2011

(54) INDEXING AND SEARCHING AUDIO USING TEXT INDEXERS

(75) Inventors: Frank T. B. Seide, Hamburg (DE); Peng Yu, Beijing (CN); Albert Joseph Kishan Thambiratnam, Beijing (CN)

(73) Assignee: Microsoft Corporation, Redmond, WA (US)

(*) Notice: Subject to any disclaimer, the term of this patent is extended or adjusted under 35 U.S.C. 154(b) by 394 days.

(21) Appl. No.: 11/952,817

(22) Filed: Dec. 7, 2007

(65) Prior Publication Data
US 2009/0150337 A1 Jun. 11, 2009

(51) Int. Cl.
G06F 17/00 (2006.01)
(52) U.S. Cl. ........ 707/715; 707/706; 707/708; 707/723; 707/728
(58) Field of Classification Search .................. 707/706, 707/708, 715, 723, 728
See application file for complete search history.

(56) References Cited

U.S. PATENT DOCUMENTS

| 6,345,253 | B1 | 2/2002 | Viswanathan |
| 6,877,001 | B2 | 4/2005 | Wolf et al. |
| 7,110,664 | B2 | 9/2006 | Yogeshwar et al. |
| 7,257,533 | B2 | 8/2007 | Charlesworth et al. |
| 7,272,558 | B1 | 9/2007 | Soucy et al. |
| 7,272,562 | B2 | 9/2007 | Olorenshaw et al. |
| 7,562,010 | B1* | 7/2009 | Gretter et al. ............ 704/9 |
| 2003/0171926 | A1 | 9/2003 | Suresh et al. |
| 2004/0199494 | A1 | 10/2004 | Bhatt |
| 2006/0116997 | A1 | 6/2006 | Yu et al. |
| 2007/0053513 | A1* | 3/2007 | Hoffberg ............ 380/201 |
| 2007/0106509 | A1 | 5/2007 | Acero et al. |
| 2007/0106685 | A1 | 5/2007 | Houh et al. |
| 2007/0112855 | A1 | 5/2007 | Ban et al. |
| 2007/0143110 | A1 | 6/2007 | Acero et al. |

FOREIGN PATENT DOCUMENTS

EP 1630705 A3 10/2006

OTHER PUBLICATIONS

International Search Report, Application No. PCT/US2008/085779, completed Mar. 31, 2009, received Mar. 31, 2009.
Brin, et al., "The Anatomy of a Large-Scale Hypertextual Web Search Engine", Date: 1998, pp. 107-117.
Chelba, et al., "Soft Indexing of Speech Content for Search in Spoken Documents", Date: Jul. 2007, vol. 21, Issued: 3, pp. 458-478.

(Continued)

*Primary Examiner* — Sana Al Hashemi
(74) *Attorney, Agent, or Firm* — Lyon & Harr, L.L.P.; Craig S. Fischer

(57) ABSTRACT

A full-text lattice indexing and searching system and method for indexing word lattices using a text indexer to enable enhance searching of audio content. The system and method utilize a Time-Anchored Lattice Expansion (TALE) method that represents word lattices such that they can be indexed with existing text indexers with little or no modification. Embodiments of system and method include an indexing module for generating and indexing word lattices based on audio content and a searching module for allowing searching of a full-text index containing indexed word lattices. The indexing module includes a custom IFilter and a custom Wordbreaker. Embodiments of the searching module include an ExpandQuery function for decorating an input query and a custom Stemmer. Embodiments of the searching module also include a GenerateSnippets module that extracts information from the indexed word lattices to enable the creation of clickable snippets.

20 Claims, 10 Drawing Sheets

OTHER PUBLICATIONS

Chelba, et al., "Position Specific Posterior Lattices for Indexing Speech", Proceedings of the ACL, Date: 2005, pp. 1-8.

Evermann, et al., "Development of the 2004 CU-HTK English CTS Systems Using More Than Two Thousand Hours of Data", Date: 2004, pp. 1-7.

Glass, et al., "Analysis and Processing of Lecture Audio data: Preliminary Investigation", Proceedings of the HLTNAACL' 2004 Workshop: Interdisciplinary Approaches to Speech Indexing and Retrieval, Boston, Date: 2004, pp. 1-4.

Padmanabhan, et al., "Automatic Speech Recognition Performance on a Voicemail Transcription Task", IEEE Transactions on Speech and Audio Processing, Date: 2002, vol. 10, Issue: 7, pp. 433-442.

Saraclar, et al., "Lattice-Based Search for Spoken Utterance Retrieval", Proceeding of the HLT, Date: 2004, pp. 1-8.

Silverstein, et al., "Analysis of a Very Large Web Search Engine Query Log", ACM SIGIR Forum, Date: 1999, vol. 33, Issue: 1, pp. 6-12.

Wessel, et al., "Using Posterior Word Probabilities for Improved Speech Recognition", Proceedings of the IEEE International Conference on Acoustics, Speech, and Signal Processing, ICASSP, Date: 2000, vol. 3, pp. 1587-1590.

Yu, et al., "A Hidden-State Maximum Entropy Model for Word Confidence Estimation", In Proceedings of the ICASSP'2007, Date: Apr. 15-20, 2007, vol. 4, pp. IV-785-IV-788.

Yu, et al., "A Hybrid Word / Phoneme-Based Approach for Improved Vocabulary-Independent Search in Spontaneous Speech", Proceedings of the ICLSP, Date: 2004, pp. 1-4.

Yu, et al., "Vocabulary-Independent Indexing of Spontaneous Speech", IEEE Transactions on Speech and Audio Processing, Date: Sep. 2005, vol. 13, Issue: 5, pp. 635-643.

Zhou, et al., "Towards Spoken-Document Retrieval for the Internet: Lattice Indexing for Large-Scale Web-Search Architectures", Proceedings of the HLT, Date: 2006, pp. 415-422, Association for Computational Linguistics, NJ, USA.

Burget, L., J. Černocký, M. Fapšo, M. Karafiát, P. Matejka, P. Schwarz, P. Smrž and I. Szöke, Indexing and search methods for spoken documents, Proc. of the Ninth Int'l, Conf. on Text, Speech and Dialogue, 2006, pp. 351-358, vol. 4188, Springer Berlin / Heidelberg, Berlin, Germany.

Chelba, C., A. Acero, Speech Ogle: Indexing uncertainty for spoken document search, Proc. of the ACL 2005 on Interactive Poster and Demonstration Sessions, Jun. 25-30, 2005, pp. 41-44, ACM, Ann Arbor, Michigan.

Garofolo J., J. Lard, E. Voorhees, 2000 TREC-9 Spoken document retrieval track, National Institute of Standards and Technology, Information Technology Laboratory, Sep. 6, 2001, available at http://trec.nist.gov/pubs/trec9/sdrt9_slides/sld001.htm.

L. Mangu, E. Brill and A. Stolcke, Finding consensus in speech recognition: Word error minimization and other applications of confusion networks, Computer, Speech and Language, Oct. 2000, vol. 14 No. 4, pp. 373-400, Elsevier.

Olsson, J. S., Wintrode, J., Lee, M., Fast unconstrained audio search in numerous human languages, IEEE Int'l Conf. on Acoustics, Speech and Signal Processing, Apr. 15-20, 2007, pp. 77-80, vol. 4, IEEE, Honolulu, HI.

Saraclar, M., R. Sproat, Lattice-based search for spoken utterance retrieval, Proceedings of the Human Language Tech. Conf. of the North American Association for Computational Linguistics, 2004, pp. 129-136, Boston, MA.

* cited by examiner

INDEXING AND SEARCHING AUDIO USING TEXT INDEXERS

BACKGROUND

There has been a dramatic increase in the available audio content in the enterprise environment. Audio content includes both audio documents (streaming audio and audio recordings) as well as the audio portion of video documents (streaming video and video recordings). Audio content is contained in online lecture videos, archived meetings, archived conference calls, and voicemail.

Because there often is a great deal of audio content in the enterprise environments, it frequently is desirable to be able to search the audio content of documents. However, unlike Internet audio and video content, the enterprise setting offers little meta-data such as anchor text, surrounding text, closed captions. Thus, indexing such meta-data, while successful for Internet content, results in poor search accuracy in the enterprise context.

Another way to search enterprise audio content is by using text indexing. Typical text indexing uses speech-to-text (STT) algorithms and indexes the words that are output from these algorithms. However, for typical enterprise audio content, state-of-the-art speech recognition software achieves speech-to-text word accuracies of only about 50-60%. Thus, this direct speech recognition approach results in suboptimal search accuracy.

One way to substantially improve the search accuracy of speech-recognition based text indexing is by indexing "word lattices" instead of just single words. Word lattices are representations of alternative recognition candidates of a word that were also considered by the speech recognizer, but did not turn out to be the top-scoring candidate. This is a form of speech recognition results, but contains more information. In particular, each word lattice contains at least three types of information: (1) a possible replacement for the query word (or candidates for replacement); (2) time boundary information of the query word (a start time and an end time); and (3) a confidence level or score for the query word.

The use of word lattices improves accuracy in two ways. First, there are less false positives because word lattices provide confidence scores that can be used to suppress low-confidence matches. Second, there are less false negatives. This is because word lattices discover sub-phrases and AND matches where individual words are of low confidence. The fact that the individual words are queried together, however, allows the inference that they still may be correct. Using the lattice approach instead of only using speech recognition improves the accuracy of the audio content search by 60 to 140%. Thus, this lattice approach works well for indexing audio content.

There are problems, however, when trying to use lattice approach to deal with a real-world application. It is desirable to use existing text indexers to index the word lattices. However, text indexers are able to index only simple words and phrases, and lattice structures are quite complicated and contain additional information. For example, a Structured Query Language (SQL) full-text engine has no field in which to store a confidence level. Moreover, in SQL word positions are not sufficient because word alternates may be not aligned. For example, an alternate phrase may span two words. Further, the original text-ingestion plug-in interface (or IFilter) of the SQL full-text engine does not allow the output of more than one word for each word position. Thus, word lattices cannot be indexed by traditional text indexers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the full-text lattice indexing and searching system and method enables indexing of word lattices using a standard text indexer in an enterprise environment. The use of word lattices for speech recognition and audio content searching greatly improves search performance and accuracy. However, enterprise-scale search engines are generally designed for linear text. Linear text is suboptimal for audio search, where accuracy can be significantly improved if the search includes alternate recognition candidates, commonly represented as word lattices.

Embodiments of the full-text lattice indexing and searching system and method include customized plug-ins, dynamic link libraries, and functions that enable the indexing and searching of word lattices by enterprise-scale search engines. By enabling use of existing text indexers, the full-text lattice indexing and searching system and method can capitalize on the immense investments made on enterprise text search products, and opens a path for accelerated deployment of speech-recognition based audio and video search solutions in the enterprise.

At a high level, embodiments of the full-text lattice indexing and searching system and method include an indexing module for generating and indexing word lattices based on audio content, and a searching module for allowing searching of a full-text index containing indexed word lattices. In particular, embodiments of the indexing module use Time-Anchored Lattice Expansion (TALE) to process incoming audio content. The TALE method allows a word lattice to be fit into a word slot of a text indexer. In general, the text indexer can only place one word in a word slot, but the TALE method processes a word lattice such that it fits within a word slot, even though the word lattice is a complicated structure that contains numerous words.

In some embodiments, the indexing module includes a custom Index function that performs speech recognition on the incoming audio content. The custom Index function outputs an audio index blob containing word lattices. Size reduction techniques are used to reduce the size of the word lattices. In some embodiments the size reduction technique is a Time-based Merging for Indexing (TMI) technique that is used to reduce word lattice size. Although size reduction techniques are optional, they are used in some embodiments because word lattices can be quite large.

Further processing is performed by a custom IFilter and a custom Wordbreaker. The custom IFilter performs a process called "binning" on the word lattices, such that words are aligned with the nearest anchor points. A normal word lattice is quite messy, having several interconnections but lacking any type of column structure. Binning places the word lattices in a structured column format. This format has a word and its associated word candidates placed in a single column. This structure column data is stored in a full-text engine table. Moreover, the custom IFilter appends confidence scores for each word in the word lattice. The custom IFilter encodes each column as a single linear text string for output to the custom Wordbreaker. The custom Wordbreaker decodes the string to recover the word lattice columns and the associated confidence scores. This information is stored in the full-text index.

At this point the word lattices are stored in the full-text index. However, the standard text indexer will not recognize the additional information stored along with each word. In order to perform an optimal search the full-text lattice indexing and searching system and method includes a searching module that includes novel functionality. Embodiments of the searching module include an ExpandQuery function for decorating an input query. A user inputs a query along with a desired confidence level, and the ExpandQuery function appends the desired confidence level to the query.

The decorated query is sent to the custom Wordbreaker for expansion into multiple queries corresponding to the various confidence levels. A custom Stemmer is used to strip off the confidence level information from each query. These stripped queries are sent to an original Stemmer, which finds multiple variations of each search term in the query. The queries and the variations are sent back to the custom Stemmer where the removed confidence information is re-appended. These queries and their variations, along with their corresponding confidence levels, are used to search the full-text index.

Embodiments of the searching module also include a GenerateSnippets module. The module extracts information such as the expanded query, documents hits from a full-text searcher, and the audio index blob, in order to enable clickable snippets to be created. These clickable snippets are presented to a user in the search results. When the user clicks on a clickable snippet he is taken to the corresponding position in the audio document.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the full-text lattice indexing and searching system and method reference is made to the accompanying drawings, which form a part thereof, and in which is shown by way of illustration a specific example whereby embodiments of the full-text lattice indexing and searching system and method may be practiced. It is to be understood that other embodiments may be utilized and structural changes may be made without departing from the scope of the claimed subject matter.

I. System Overview

Figure 1:
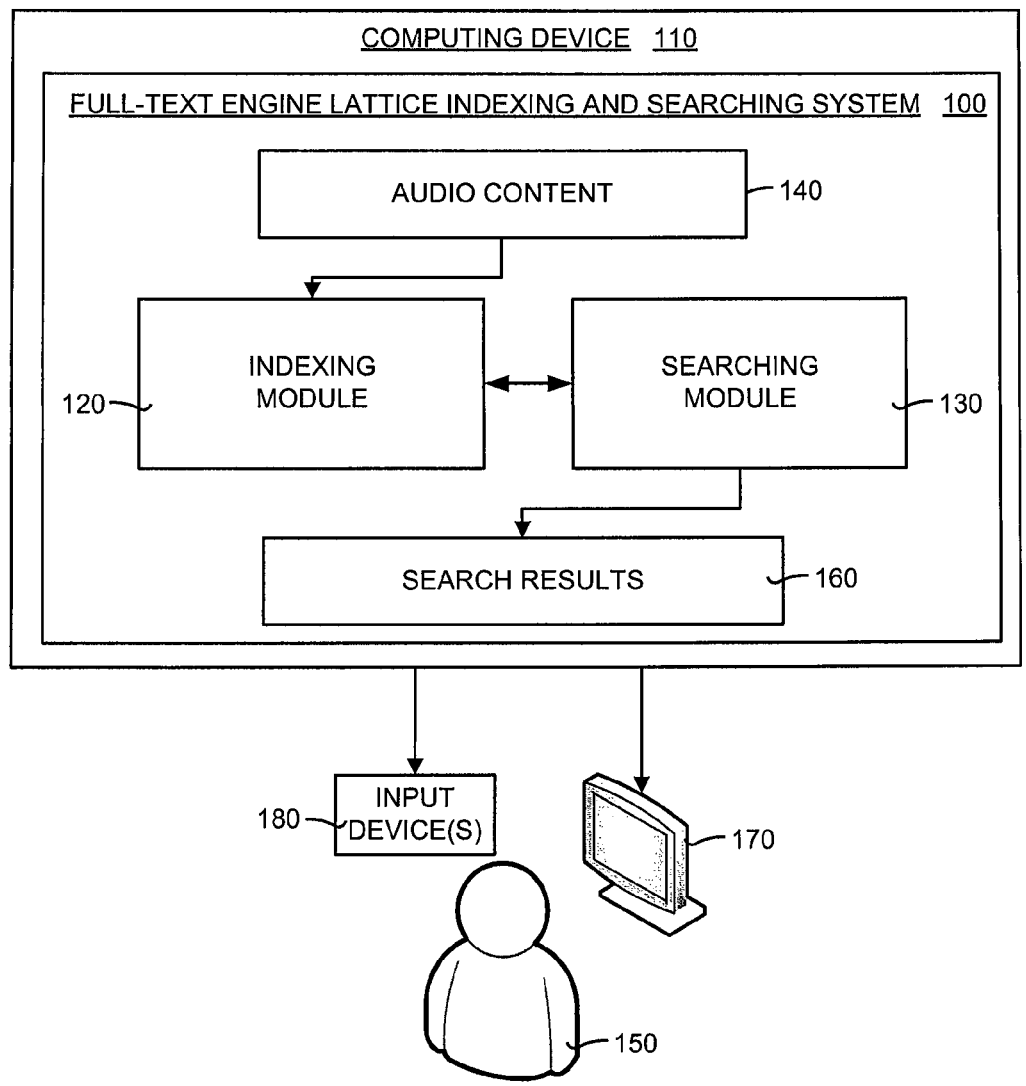
FIG. 1 is a block diagram illustrating a general overview of the full-text lattice indexing and searching system and method disclosed herein.

FIG. 1 is a block diagram illustrating a general overview of the full-text lattice indexing and searching system and method disclosed herein. It should be noted that the implementation shown in FIG. 1 is only one of many implementations that are possible. Referring to FIG. 1, a full-text lattice indexing and searching system 100 is shown implemented on a computing device 110. It should be noted that the computing device 110 may include a single processor (such as a desktop or laptop computer) or several processors and computers connected to each other.

The full-text lattice indexing and searching system 100 includes an indexing module 120 and a searching module 130. The indexing module 120 utilizes standard and custom functionality in order to place a word lattice in a searchable index. Input to the index module 120 is audio content 140. As stated above, audio content includes both audio documents as well as the audio portion of video documents. The audio content 140 is processed by the indexing module 120 such that the word lattices are indexed by a text indexer. This allows the audio content 140 to be searched accurately and efficiently.

The full-text lattice indexing and searching system 100 also includes the searching module 130. The searching module 130 utilizes standard and custom functionality to search the indexed word lattices. Moreover, the searching module 130 returns and displays to a user 150 search results 160 of a search of the indexed word lattices.

The search results 160 and other information from the full-text lattice indexing and searching system 100 are displayed to the user 150 through a display device 170 that is connected to the computing device 110. It should be noted there may be one or more display devices connected to the computing device 110. The user 150 is able to input information and interact with the full-text lattice indexing and searching system 100 through one or more input devices 180 (such as a keyboard or pointing device). In addition, the computing device 110, display device 170, and input devices 180 may be integrated into a single device.

II. System Architecture Details

Figure 2:
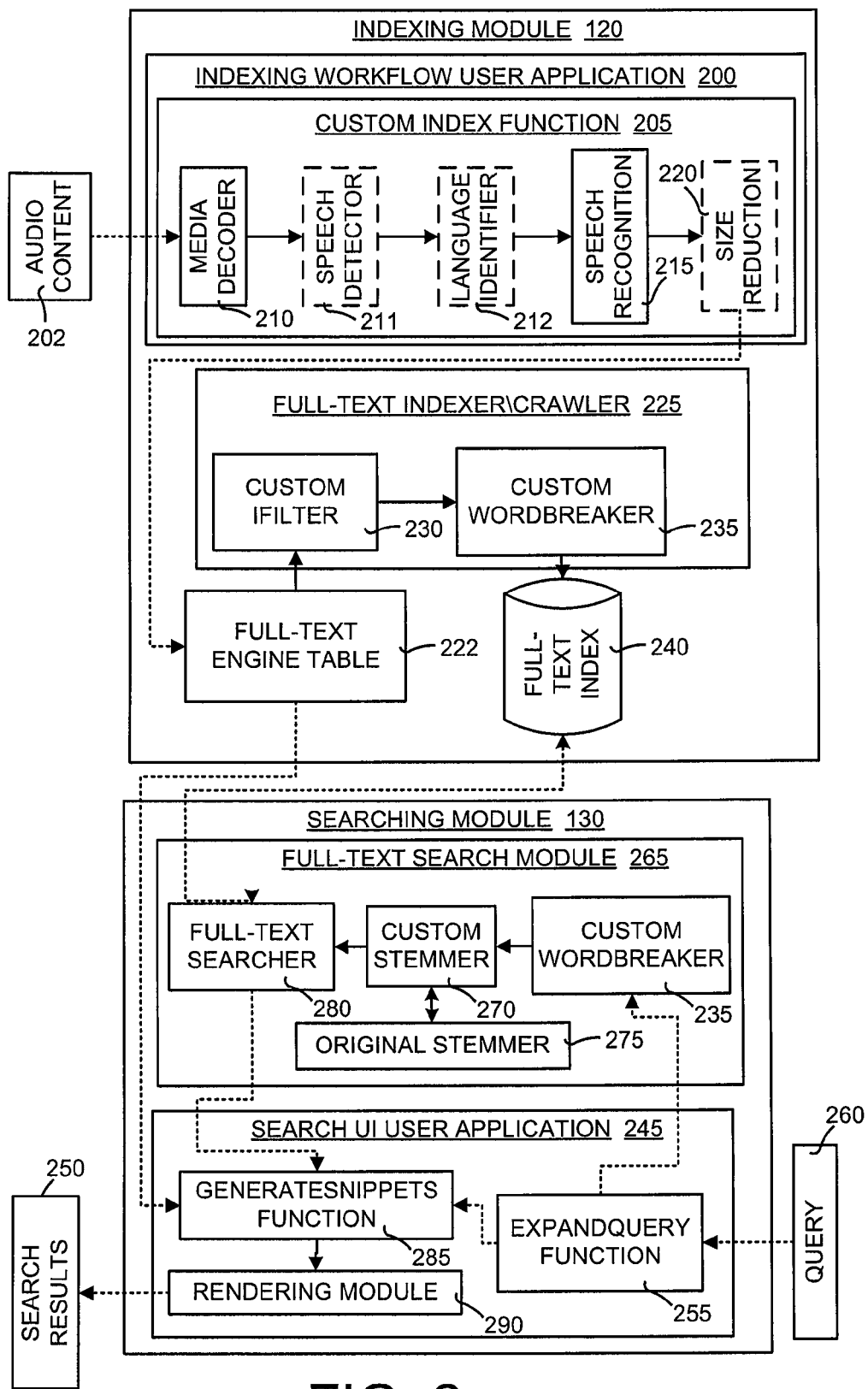
FIG. 2 is a block diagram illustrating the details of a first embodiment of the full-text lattice indexing and searching system shown in FIG. 1.

FIG. 2 is a block diagram illustrating the details of a first embodiment of the full-text lattice indexing and searching system 100 shown in FIG. 1. In FIG. 2, the optional modules are represented by dashed boxes and the operational flow is represented by dashed lines. In general, in this first embodiment the system architecture allows indexing of word lattices within the constraints of a full-text search engine having a text indexer. In the description below, reference will be made to Structured Query Language (SQL) server modules, functions, and calls. It should be noted that SQL is built on a more generic full-text search engine called the Microsoft® full-text search engine. This full-text search engine and full-text indexer/crawler is also used in other products such that other products besides SQL could implement the full-text lattice indexing and searching system 100 and method. By way of example, these products includes SharePoint®, Microsoft® Outlook® (such as for searching voice mails), Windows® desktop search, Vista search, and SQL Server Integrated Full-Text Search (IFTS).

As described in detail below, the full-text lattice indexing and searching system 100 and method can integrate with existing products without having to change the product. This is achieve by intelligent and novel design choices, custom dynamic link libraries (DLLS) and plug-ins, and custom functions that can be used with the Microsoft® full-text search engine. This allows word lattices to be indexed and searched by integrating the full-text lattice indexing and searching system 100 and method with existing products.

Referring to FIG. 2, the indexing module 120 includes an indexing workflow user application 200 that prepares the audio content 202 of documents for indexing by the text indexer. A custom Index function 205 inputs the audio content 202 for decoding by the media decoder 210. Next, the decoded audio content 202 is processed by an optional speech detector 211 to identify whether the audio content 202 is speech and, if so, in which locations the speech is located. Moreover, the audio content 202 can be processed by an optional language detector 212 that determines the language of the speech in the audio content 202. The speech detector 211 and the language detector 212 are optional, as denoted by the dashed boxes. The indexing module 120 also includes a speech recognition module 215 that performs a word lattice processing on the audio content 202 to obtain word lattices. A size reduction module 220 may be used to reduce the size of the word lattices. In some embodiments the size reduction technique is a Time-based Merging for Indexing (TMI) technique that is used to reduce word lattice size. It should be noted that this size reduction module 220 is optional, as denoted by the dashed box. Although size reduction techniques are optional, they are used in some embodiments because word lattices can be quite large. At this point, the word lattices are arranged in columns such that each word and its associated word candidates are contained in a single column. This structure is stored in a full-text engine table 222.

The indexing module 120 also includes a full-text indexer\crawler 225. The indexer\crawler 225 is the core of the architecture of the full-text search engine. However, the idea is not to change the architecture of the indexer\crawler 225. Instead, the full-text lattice indexing and searching system 100 provides custom plug-ins and functions to ensure that the word lattices are capable of being indexed by the text indexer.

The full-text indexer\crawler 225 includes a custom IFilter 230 and a custom Wordbreaker 235. After processing by the custom IFilter 230 and the custom Wordbreaker 235, the word lattices are capable of being indexed by the text indexer. The word lattices are stored in a full-text index 240 and at this time are completely searchable.

The searching module 120 includes a search user interface user application 245 that generates queries and displays search results 250 to a user. The search user interface user application 245 includes an ExpandQuery function 255 that receives a query 260 and decorates the query 260 with confidence levels as specified by the user. The decorated query is sent to the custom Wordbreaker 235 for expansion into separate query tokens.

The searching module 130 also includes a full-text search module 265 that enables searching of the full-text index 240.

The full-text search module 265 includes the custom Wordbreaker 235, a custom Stemmer 270, an original Stemmer 275, and a full-text searcher 280. As explained in detail below, the expanded and decorated queries are processed by the custom Stemmer 270 and the original Stemmer 275 to generate additional queries. These queries are used by the full-text searcher 280 to search the full-text index 240.

The search user interface user application 245 also includes a GenerateSnippets function 285 that takes documents hits full-text searcher 280 and processes them so that the search results 250 are clickable for the user. In other words, the user is able to click on a search results and is taken to that position of audio content in the document. The search results 250 then are processed by a rendering module 290 and displayed to the user.

III. Operational Overview

In general, the full-text lattice indexing and searching method uses a traditional full-text search engine to index the word lattices corresponding to audio content such that the audio content can be searched using word lattices. The use of word lattices greatly improves the accuracy of the search. At indexing time, the media decoder 210 extracts the raw audio content 202 from different formats of audio found in the enterprise. This is then fed into the speech recognition module 215, which in some embodiments is a large-vocabulary continuous-speech recognizer (LVCSR). The speech recognition module 215 outputs word lattices. In some embodiments the lattices are processed with the Time-Anchored Lattice Expansion (TALE) technique (described below) and merged into the full-text index 240.

At search time, list of hits of all query terms is retrieved from the index 240 and intersected (including phrase matching) to determine documents that contain all query terms. The GenerateSnippets function 285 computes relevance scores and creates snippets for the returned documents and composes the result page. The search results 250 contain time information for individual word hits to allow easy navigation and preview.

Figure 3:
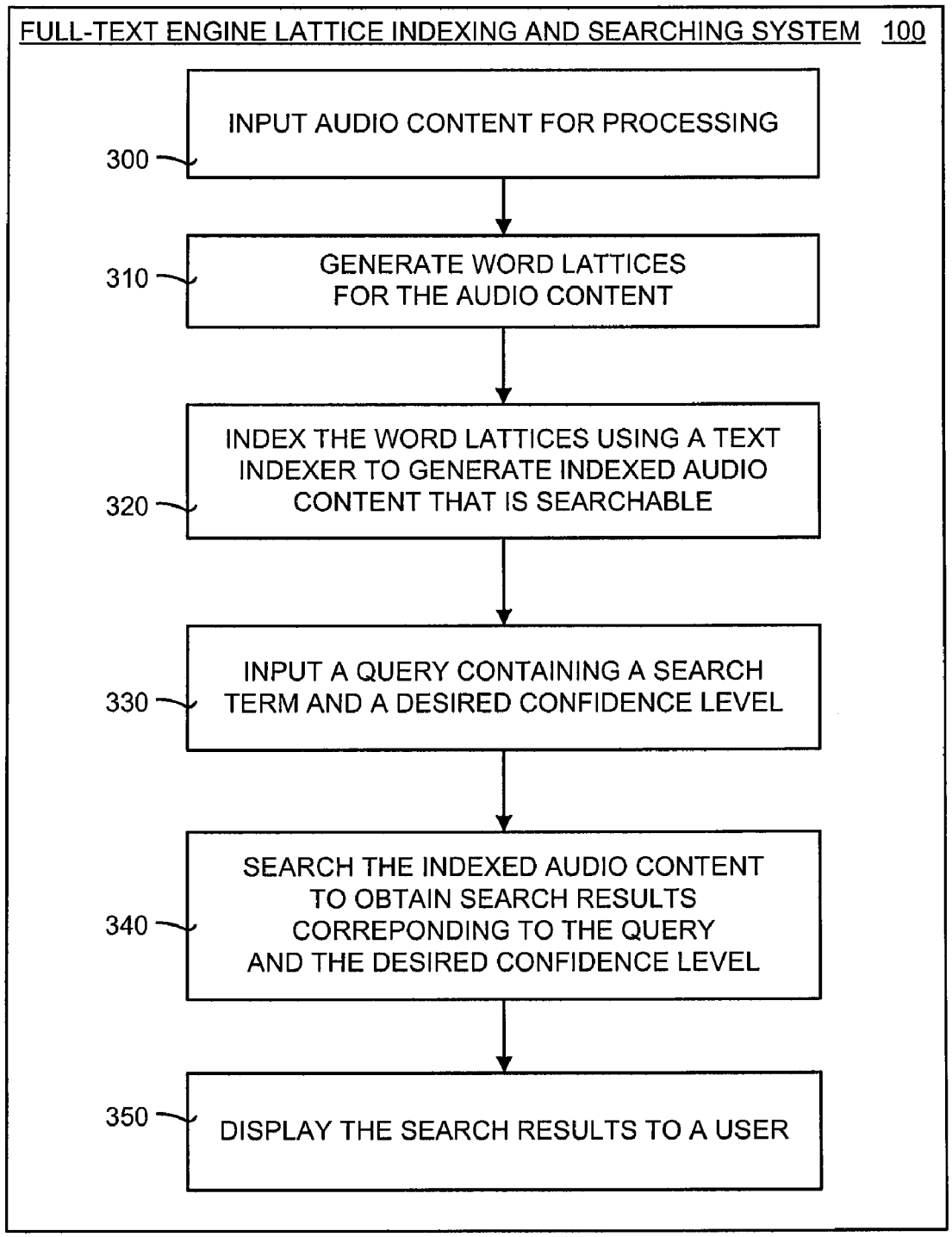
FIG. 3 is a block diagram illustrating a general overview of the full-text lattice indexing and searching system and method disclosed herein.

FIG. 3 is a block diagram illustrating a general overview of the full-text lattice indexing and searching system 100 and method disclosed herein. In particular, referring to FIG. 3, the full-text lattice indexing and searching method begins by inputting audio content for processing (box 300). As mentioned above, this audio content may be from audio or video documents. The method then generates word lattices for the audio content (box 310). The process is explained in detail below. Next, the method indexes the word lattices using the text indexer of the full-text search engine (box 320). This generates indexed audio content from the word lattices that is completely searchable.

Once the word lattices of the audio content are indexed, the full-text lattice indexing and searching method uses novel methods to search the content. Specifically, a user inputs a query containing a search term and a desired confidence level (box 330). The confidence level states how much confidence the user wants in the search results. Next, the method searches the indexed audio content to obtain search results that correspond to the query and the desired confidence level (box 340). Finally, the method displays the search results to the user (box 350).

IV. Operational Details

The operational details of the full-text lattice indexing and searching system 100 and method now will be discussed. It should be noted that the original full-text search engine (such as the SQL server full-text search engine) is left unchanged. Instead, custom functionality in the form of dynamic link libraries and plug-ins are provided by the full-text lattice indexing and searching system 100 and method to enable indexing of word lattices by the full-text search engine. In the discussion below, the operation of the full-text lattice indexing and searching system 100 and method will be discussed in terms of the SQL server full-text search engine. However, it should be noted that the full-text lattice indexing and searching system 100 and method may be used other products and applications using the Microsoft® full-text search engine. Embodiments of the full-text lattice indexing and searching system 100 and method include several components, modules, and sub-modules. The details of each of these items now will be discussed.

IV.A. Indexing Module

The indexing module 120 contains a number of other module and functions. This module 120 generates and processes word lattices from audio content such that the word lattices are indexed by a text indexer. This allows the audio content to be searched accurately and efficiently.

IV.A.1. Custom Index Function

The custom index function 205 processes incoming audio content 202 to generate word lattices. The audio content is processed by the media decoder 210 to decode any audio content that may be encoded. The speech recognition module 215 generates the word lattices. The optional size reduction module 220 can be used to reduce the size of the word lattices. In some embodiments this size reduction module 220 uses a Time-based Merging for Indexing technique to achieve this size reduction. The output of the Custom Index Function 205 is a structured table whereby each word lattice is in a separate column.

Word Lattices

A word lattice is $$L=(N,A,n_{enter},n_{exit}),$$

and is a weighted directed acyclic graph (DAG) where arcs A represent word hypotheses with recognizer scores, and nodes N represent the connections between them, encoding times and possibly context conditions. Alternative definitions of lattices are possible, such as nodes representing words and arcs representing word transitions. $n_{enter}$ and $n_{exit} \in N$ are the unique initial and final node, respectively. The recognizer score of a word hypothesis is used as the arc weight:

$$q_{n_s,\omega,n_e} = p^{\frac{1}{\lambda}}(O(t_{n_s}...t_{n_e}) \mid n_s, \omega, n_e) \cdot P(\omega \mid n_s)$$

where, $$p(O(t_{n_s}...t_{n_e}) \mid n_s, \omega, n_e)$$

is the likelihood for acoustic observation:

$$O(t_{n_u}...t_{n_e})$$

given word ω, its time boundaries ($t_s$, $t_e$), and its cross-word triphone context ($n_s$, $n_e$). $P(\omega|n_s)$ is the language-model (LM) probability of word ω to follow its LM history (encoded in $n_s$). λ is the well-known LM weight. Despite its name, the function of the LM weight is now widely considered to be to flatten acoustic emission probabilities. This matters when sums of path probabilities are taken instead of just determining the best path. Consider $q_{ns,\omega,ne}=0$ for non-existent arcs.

The lattice representation answers one question of interest: Given an observed audio recording O, what is the probability:

$$P(*-t_s-\omega-t_e-*|O)$$

that a particular word ω was spoken at a particular time $t_s$ ... $t_e$? This quantity is called the word posterior probability. Despite its name, it is defined over paths, and $$*-t_s-\omega-t_e-*$$

shall denote the set of paths that contain ω with boundaries $t_s$ and $t_e$. To compute it, a sum is taken over all nodes ($n_s$, $n_e$) with the given time points $(t_s,t_e)^3$:

$$P(*-t_s-\omega-t_e-*\mid O) = \sum_{\substack{(n_s,n_e):\\ t_{n_s}=t_s \wedge t_{n_e}=t_e}} P(*-n_s-\omega-n_e-*\mid O)$$

where the arc posterior:

$$P(*-n_s-\omega-n_e-*|O)$$

is computed as:

$$P(*-n_s-\omega-n_e-*\mid O) = \frac{\alpha_{n_s} \cdot q_{n_s,\omega,n_e} \cdot \beta_{n_e}}{\beta_{n_{enter}}}$$

and the forward probability, $\alpha_{n_s}$, and the backward probability, $\beta_{n_e}$, represent the sum over all paths from sentence start $n_{enter}$ to $n_s$ and $n_e$ to sentence end $n_{exit}$, respectively. They can be computed conveniently with the forward-backward recursion. $\beta_{n_{enter}}$ is the total probability over all paths.

Relevance-ranking formulas often use the term frequency $TF_\omega$, (per-document keyword occurrence). Its expected value can be computed from the lattice as:

$$E_{\omega|O}\{TF_w\} = \sum_{\substack{\forall m,n_0...n_m:\\ n_0=n_{enter} \wedge \\ n_m=n_{exit}}} P(n_0 - \omega_1 - n_1 - ... - \omega_m - n_m) \cdot \sum_{\wedge i:\omega_i=\omega} 1$$

$$= \sum_{\forall n,n'} P(*-n-\omega-n'-*\mid O)$$

The same question can be asked for multiword sequences ($\omega_1 \omega_2, ... \omega_m$), not only to support explicitly quoted phrase queries, but also because sequence matches are significantly more accurate, and query terms often occur in sequence (implicit phrases). The phrase posterior:

$$P(*-t_s-\omega_1 ... \omega_m-t_e-*|O)$$

can be computed by summing over all m-arc paths with the given boundaries $t_s$ and $t_e$:

$$P(*-t_s-\omega_1...\omega_m-t_e-*\mid O) =$$

$$\sum_{\substack{\forall m,n_0...n_m:\\ t_{n_0}=t_s \wedge \\ t_{n_m}=t_e}} P(*-n_0-w_1-n_1-..., -\omega_m-n_m-*\mid O)$$

$$P(*-n_0-\omega_1-n_1-...-\omega_m-n_m-*\mid O) = \frac{\alpha_{n_0} \prod_{i=1}^{m} q_{n_{i-1},\omega_i,n_i} \beta_{n_m}}{\beta_{n_{enter}}}$$

In this document, an equivalent, more convenient representation is used, which is called the posterior lattice. In a posterior lattice, arc weights are not $q_{ns,\omega,ne}$ but directly the precomputed arc posteriors $$P(*-n_s-\omega-n_e-*|O)$$

This representation still allows exact computation of phrase posteriors:

$$P(* - n_0 - \omega_1 - n_1 - \ldots - \omega_m - n_m - * \mid O) = \frac{\prod_{i=1}^{m} P(* - n_{i-1} - \omega_i - n_i - * \mid O)}{\prod_{i=1}^{m-1} P(* - n_i - * \mid O)}$$

with $$P(* - n - * \mid O) = \frac{\alpha_n \beta_n}{\beta_{n_{enter}}} = \sum_{\forall n'} \sum_{\forall \omega} P(* - n - \omega - n' - * \mid O)$$

The new term,

P(*-n-*|O)

is called a node posterior. The primary advantage of the posterior representation is that posteriors are resilient to approximations like aggressive quantization and merging of alternates with non-identical time boundaries, and they allow comparing arcs with different time durations and temporal splitting (such as compound words). Further, the node posteriors turn out to be uncritical and can be replaced by a constant in some embodiments.

IV.A.2. Custom IFilter

SQL server full-text search engines use an interface called an IFilter to captures content from different file formats. In other words, the IFilter gets content out of a file. The IFilter is a plug-in because text is often encoded in proprietary binary format, such as .pdf, .doc, or .ppt. In order to get the text out from those binary, proprietary formats, the IFilter is used. This is a plug-in interface that allows vendors of the software (such as Microsoft® in the case of a .doc file) to provide an IFilter able to extract the text from the proprietary file. The IFilter normalizes the binary format into standard plain text.

Embodiments of the full-text lattice indexing and searching method includes a custom IFilter that processes the structured table where each word lattice is in a separate column that is stored in the full-text engine table 222 and outputs a word lattice capable of being indexed. This is achieved using the Time-Anchored Lattice Expansion (TALE) technique.

TALE-Time-Anchored Lattice Expansion

The main idea behind the TALE technique is to represent or approximate word lattices such that they can be indexed with existing text indexers with little or no modification. Word lattices can be indexed according to the same principles as text. An inverse index stores for every term a list of its occurrences, including document identification, relative word position, and supplementary information for ranking (such as font size). Documents can be retrieved efficiently by intersecting the lists of all query terms. For the familiar "Google-style" query, all query terms must be present at least once in a document, and for phrases, query terms must occur in consecutive word positions.

The TALE method seeks to approximate lattice indexing where changes to the core indexer code or data format are not an option. In this case, words must be aligned to word positions, forming a sausage-like lattice. The standard phrase matcher requires words belonging to phrases to be in consecutive word positions. In other words, some words must be aligned to multiple slots (overgeneration). It is impossible to guarantee retaining all possible phrases while keeping phrase posteriors and keeping the index small. Thus, priorities must be set.

Figure 4:
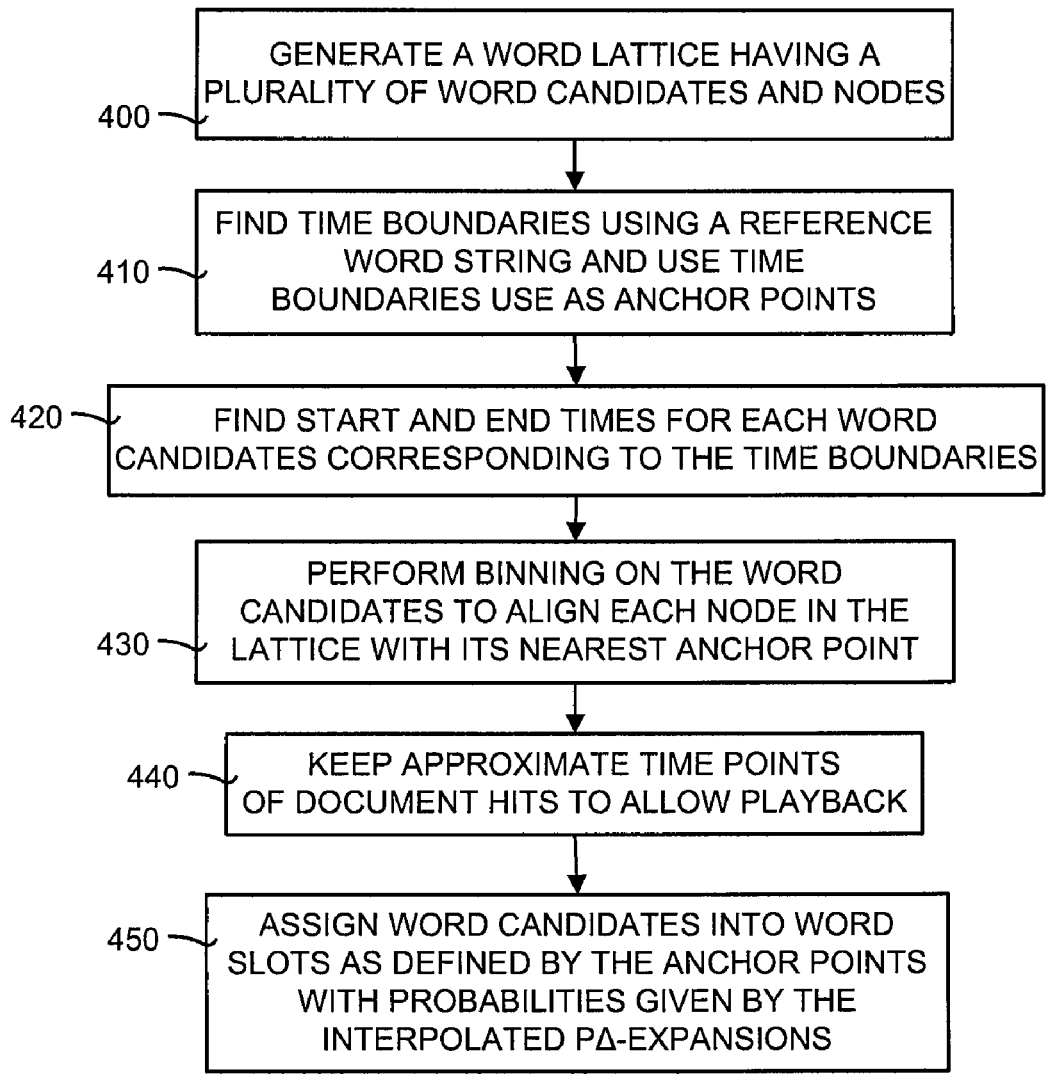
FIG. 4 is a detailed flow diagram of the TALE method used by the full-text lattice indexing and searching system method.

FIG. 4 is a detailed flow diagram of the TALE method used by the full-text lattice indexing and searching system method. First, the method generates a word lattice having a plurality of word candidates and nodes (box 400). Next, time boundaries are found using a reference word string (box 410). These time boundaries are used as anchor points. In particular, start and end times for each word candidate are found, which correspond to the time boundaries (box 420).

First, the TALE method defines the conditional probability that word $\omega$ happens as the $\Delta$-th path token after a given node n:

$$P(\omega \mid n, \Delta, O) = \frac{\sum_{\substack{\forall n_i, \omega_i: \\ i=1\ldots\Delta \wedge \omega_\Delta = \omega}} P(* - n - \omega_1 - n_1 - \ldots - \omega - n_\Delta - * \mid O)}{P(* - n - * \mid O)}$$

Then the TALE method chooses time anchor points $t_0 \ldots t_T$ to define word position slots $(t_i, t_{i+1})$, such as the time boundaries of the best path, and align each node n to the closest slot, denoted by $i = s_n$. This process is called "binning." The method performs binning on the word candidates to align each node in the word lattice with its nearest anchor point (box 430). The result of the binning process is columns of word and their associated word candidates, where each column contains a word and its corresponding word candidates.

Constraints are needed by the TALE method to enable the indexing by a standard text indexer. The three constraints use by the TALE method are: (1) retain the expected term frequencies of the word lattice, as they matter for ranking, $E_{\omega \mid O}\{TF_\omega\}$;

(2) keep approximate time points of document hits accurate enough to allow playback (box 440); and (3) have all phrases up to M words in consecutive word positions. In some embodiments M=3. The TALE method satisfies these constraints while keeping the index size reasonable.

The TALE method then assigns word candidates into word slots as defined by the anchor points, with the probabilities given by interpolated $P_\Delta$-expansions (box 450). Specifically, this is achieved by computing the probability distribution for slot i of words $\omega$ being the $\Delta$-th token of a phrase:

$$P_\Delta(\omega \mid i, O) = \sum_{\forall n: s_n + \Delta = i} P(* - n - * \mid O) \cdot P(\omega \mid n, \Delta, O).$$

This is called a "$P\Delta$-Expansion" of the word lattice. It can be shown that, $E_{\omega \mid O}\{TF_\omega\}$ remains unchanged for all $\omega$. The time information is retained by the anchor points.

In order to guarantee to retain all M-word phrases in slots, the TALE method interpolates multiple $P\Delta$-Expansions as:

$$P(\omega \mid i, O) = \sum_{\Delta=1}^{M} \alpha_\Delta \cdot P_\Delta(\omega \mid i, O)$$

with $$\sum \alpha_\Delta = 1.$$

For example, assume a 3-word phrase A-B-C in the lattice. Assume further that the starting node is at word A and is aligned with anchor point N. For a $P_0$ expansion, word A will be aligned with slot N. For a $P_1$ expansion, word B will be aligned with slot N+1. And for a $P_2$ expansion, word C will be aligned with slot N+2. If these 3 expansions are merged then word A-B-C will appear in slots N, N+1, and N+2. In some embodiments the weights $\alpha\Delta$ are optimized on a development set to maximize overall accuracy. However, this is not absolutely necessary, and other embodiments dispense with this optimization.

After running the TALE method, the resulting word lattice is close to being able to be put in the text indexer. However, for each candidate in the lattice structure still has as associated confidence score, which important to accuracy. However, normally a text indexer does not have a confidence score for each word.

The solution is to use the IFilter to quantize the confidence scores and "decorate" each word with a confidence score or level. The confidence score is quantized, and therefore there cannot be an infinite number of confidence levels. In some embodiments a word is decorated by appending characters after the word, where the number of characters corresponds to the confidence score. In some embodiments, the "@" symbol is used. For example, if a word has a confidence score of "4", then four "@" symbols are appended to the word to decorate that word, A confidence score of 5 would use 5"@"s, and so forth. In other embodiments various other symbols may be used. In still other embodiments an underscore and a number representing the confidence score is appended to the word. This decoration of the word will be accepted by the text indexer as part of the word. More specifically, the text indexer does not know what the appended characters mean (such as the "@" symbol), but takes it as any other word. Thus, different confidence levels have different suffixes appended to them. This means that the text indexer will not mix them up, but will keep them separate.

Figure 5:
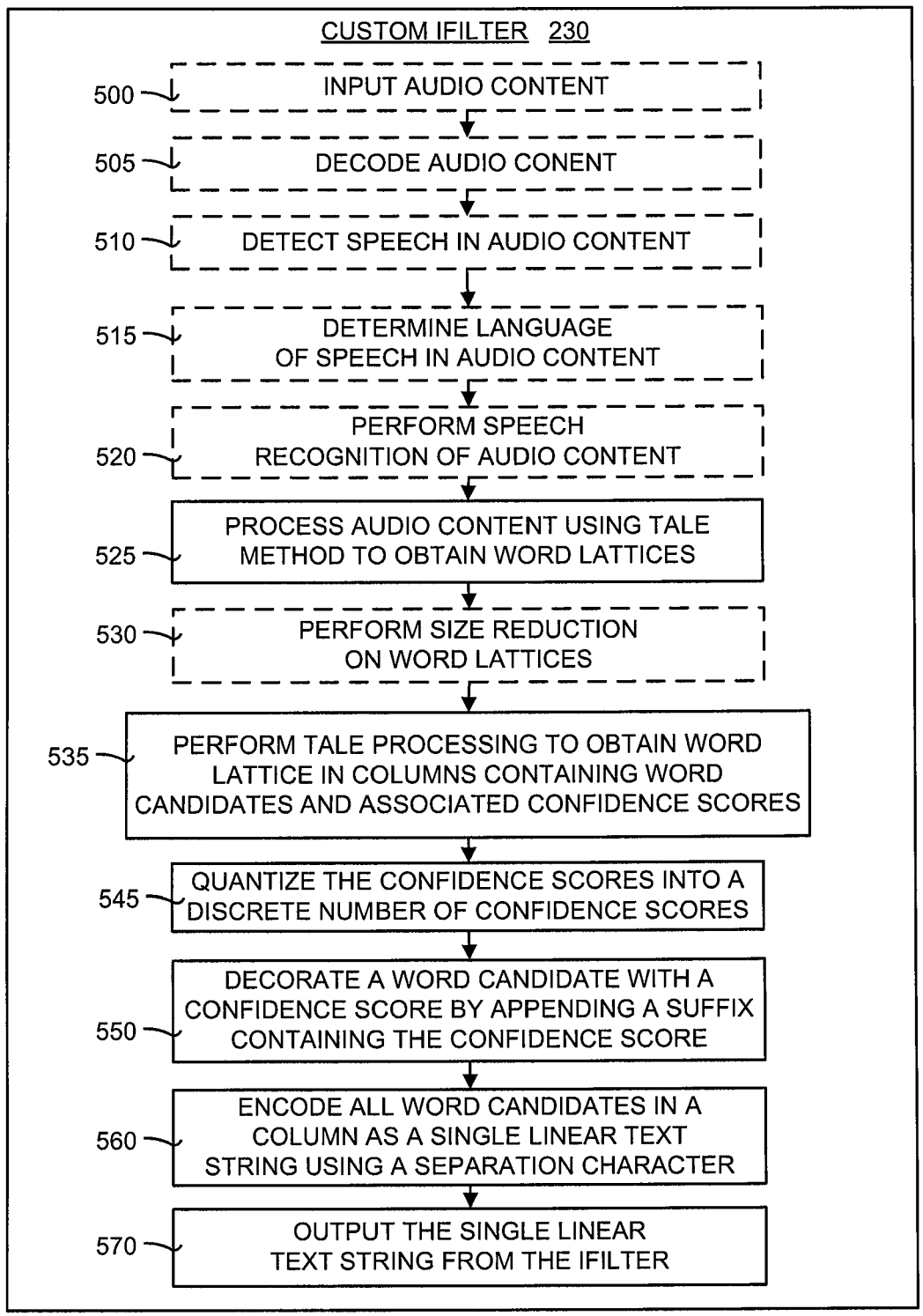
FIG. 5 is a detailed flow diagram illustrating the operation of the custom IFilter shown in FIG. 2.

FIG. 5 is a detailed flow diagram illustrating the operation of the custom IFilter 230 shown in FIG. 2. The text indexer has no natural way of representing confidence levels, so the full-text lattice indexing and searching system method uses the IFilter 230 to append a character string to represent the confidence level, even though it is not understood by the text indexer.

FIG. 5 illustrates two possible embodiments of the custom IFilter 230. In one embodiment, the processes represented by dashed boxes are included, while in other embodiments these processes are not included. Specifically, a first embodiment begins the IFilter operation by inputting audio content (box 500), decoding the audio content (box 505), and then detecting speech in the audio content (box 510). This first embodiment also determines the language of the speech in the audio content (box 515) and performs speech recognition of the audio content (box 520). This first embodiment corresponds to the embodiment where the media decoder 210, speech detector 211, language detector 212, speech recognition module 215, and the size reduction module 220 are located in the IFilter. In the second embodiment, these modules are not present in the IFilter (but are instead in the custom Index function 205), and the IFilter operation begins processing the audio content using the TALE method to obtain word lattices (box 525). The first embodiment includes performing size reduction on the word lattices (box 530), which is not done by the custom IFilter 230 in the second embodiment but instead by the custom Index function 205. The following processes are performed by the custom IFilter 230 in both embodiments. First, the TALE method is used to process the word lattices (by "binning") and obtain word lattices in columns containing word candidates and associated confidence scores (box 535). The confidence scores then are quantized into a discrete number of confidence scores (box 545). As explained above, the custom IFilter 230 then decorates a word candidate with a confidence score by appending a suffix to the word candidate (box 550). The suffix contains the confidence score of that particular word.

For each word position in the input column structure of the word lattices there are a number of alternative word candidates. The problem is that an IFilter is supposed to output linear text. Thus, there is no way for a standard IFilter to output all these alternatives. However, the method solves this problem by encoding each word candidate in a particular column as a single linear text string using a separation character (box 560). This is performed such that each column has a separate string. Moreover, a separation character is used to separate and concatenate the word candidates in a column. The output of the custom IFilter 230 is the single linear text string (box 570). Thus, for each word position is a linear string of alternatives at a certain word position that are separated by special separating characters. In some embodiments, a vertical bar is used as the special separating character. In other embodiments, other types of special separation characters may be used.

IV.A.3. Custom Wordbreaker

The SQL server full-text search engine includes an interface called a Wordbreaker. The function of the Wordbreaker is to separate non-English language characters into separate words. Moreover, the Wordbreaker is able to place multiple word alternates into the same word position. However, the text indexer only reads a linear string of text. The full-text lattice indexing and searching method uses a custom Wordbreaker to index the word lattices. The custom Wordbreaker is called by using a custom "locale identifier" (LCID). Using the custom LCID, the corresponding custom IFilter 230 and custom Wordbreaker 235 are selected. SQL server takes the custom LCID and from it can find the corresponding custom IFilter 230 and custom Wordbreaker 235.

Some languages do not have spaces between the words and do not have space characters. Thus, it cannot be determined where a word starts and where the word ends. The problem of breaking the plain text into individual words is a challenge that is assumed by the Wordbreaker. Like the IFilter, the Wordbreaker is a plug-in. Moreover, there are different Wordbreakers for different languages and sub-languages.

The primary objective of the Wordbreaker is to guess where the spaces are between words and break up the plain text string into tokens. Each token then corresponds to a word position. The Wordbreaker determines the word position. In addition, the Wordbreaker can expand abbreviations. For example, the phrase "Microsoft Corp." can be expanded by the Wordbreaker into "Microsoft Corporation." This is done in the Wordbreaker and not some other stage because context is needed. Some abbreviations can means multiple things, and neighboring words need to be examined to determine what the abbreviations means and how or whether to expand the abbreviation. This ability of the Wordbreaker is what is being utilized by embodiments of the full-text lattice indexing and searching method for injecting alternative word candidates into the full-text index without requiring code changes to the underlying text indexer.

Figure 6:
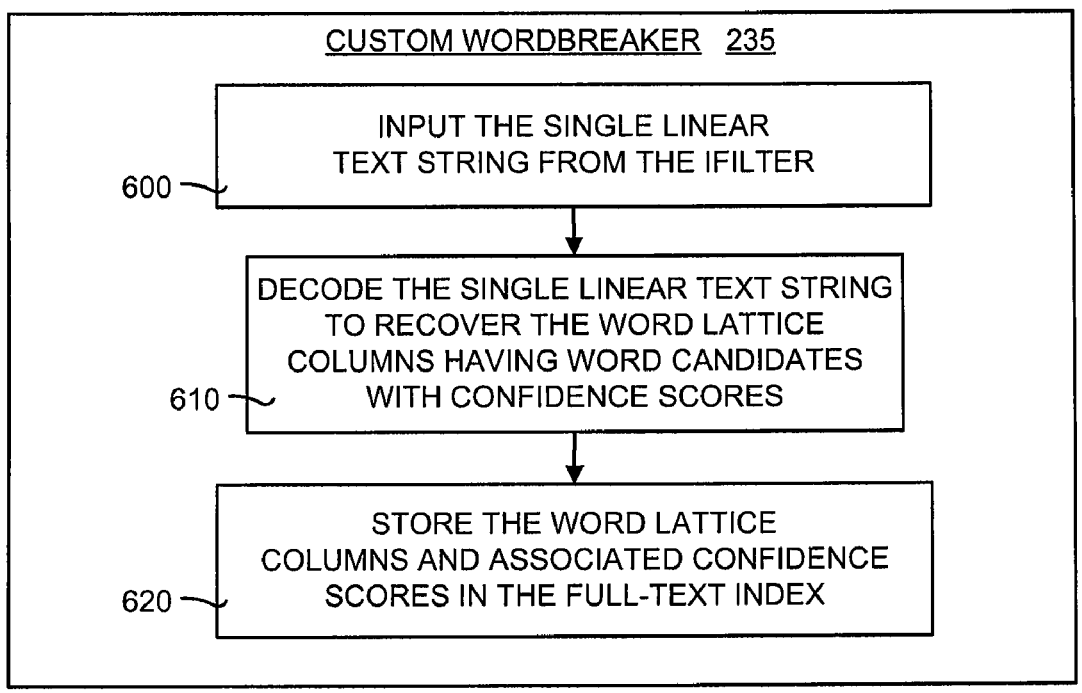
FIG. 6 is a detailed flow diagram illustrating the operation of the custom Wordbreaker shown in FIG. 2.

FIG. 6 is a detailed flow diagram illustrating the operation of the custom Wordbreaker 235 shown in FIG. 2. The process begins by inputting the single linear text string that is output from the custom IFilter 230 (box 600). As explained above, this string contains a word and its alternative word candidates.

The custom IFilter 230 outputs only linear text strings. Because of this, the columns and word lattices are encoded by the custom IFilter 230 as a single linear text string 230 for output to the custom Wordbreaker 235. The main purpose of performing this encoding in the custom IFilter 230 is for decoding in the custom Wordbreaker 235.

Accordingly, the single linear text string is decoded by the custom Wordbreaker 235 to recover the word lattice columns and associated confidence scores (box 610). The word lattice columns and associated confidence scores are stored in the full-text index 240 (box 620). The custom Wordbreaker 235 does not really output anything, but instead makes function calls to the full-text index 240. In SQL server, there are two functions that are used to call the full-text index 240. Namely, one of the PutWord( ), and the Put{Alt}Word( ) function (where Alt means alternative) are called for every token in the multiple word lattice column structure.

IV.B. Searching Module

The searching module 130 contains a number of other module and functions. This module 130 utilizes standard and custom functionality to search the indexed word lattices. Searching the indexed word lattices is not trivial, because during indexing the word lattices were decorated and other information was attached. Moreover, the searching module 130 returns and displays to a user 150 search results 160 of a search of the indexed word lattices.

IV.B.1. ExpandQuery Function

Figure 7:
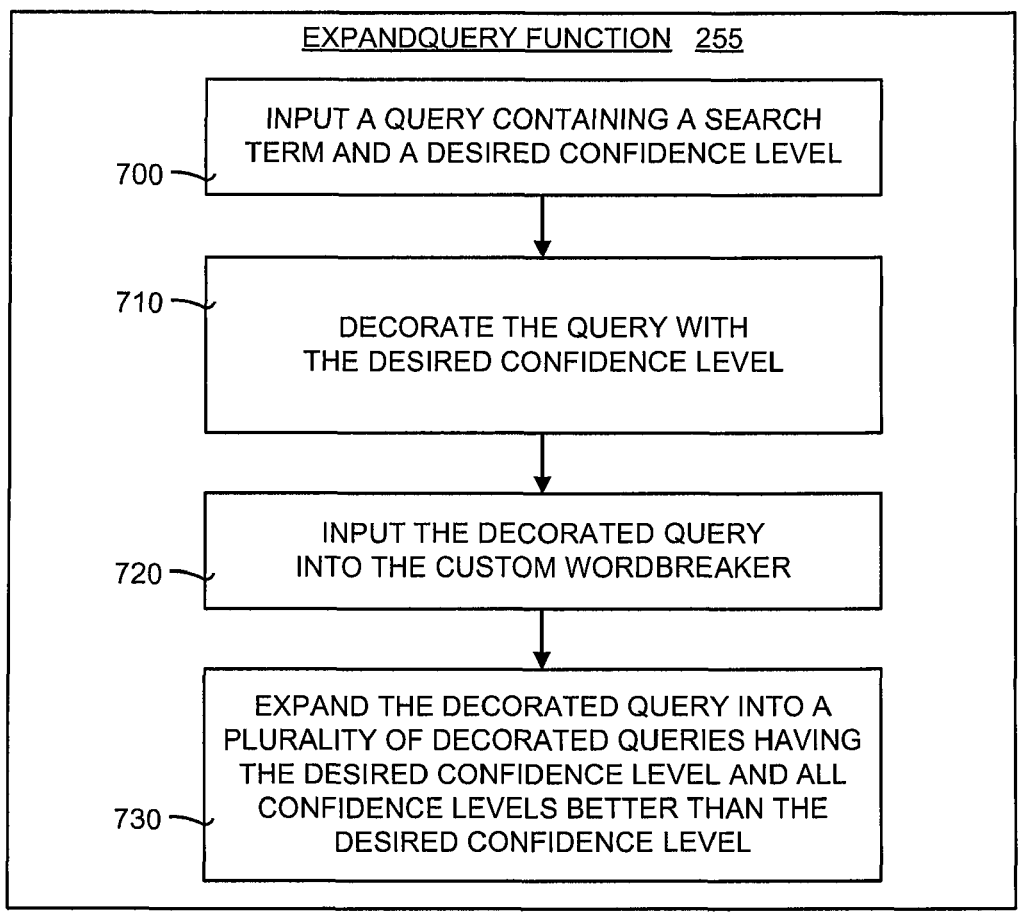
FIG. 7 is a detailed flow diagram illustrating the operation of the ExpandQuery function shown in FIG. 2.

The ExpandQuery function 255 processes an incoming query and expands the query based on a desired confidence level. FIG. 7 is a detailed flow diagram illustrating the operation of the ExpandQuery function 255 shown in FIG. 2. The process begins by inputting a desired confidence level and a query containing at least one search (or query) term (box 700). The desired confidence level is how much confidence a user wants the search result to contain. For example, assume that the user wants a confidence level 8. If there are 10 confidence levels, and a confidence level of 2 is better than a confidence level of 1, then automatically this means confidence levels 8 (the desired confidence level) and 9 and 10. This can be implemented by a simply OR operation. The actual search accuracy associated with a specific confidence level depends on the structure of the query, specifically the number of words. The more words, the lower the confidence level can be chosen. One way to choose the confidence level is by looking up the value from a table computed on a development data set to map the user's required accuracy and query structure/number of words.

As described above with regard to the custom IFilter 230, the query is decorated with the desired confidence level, which is understood by the subsequent stage to stand for all confidence levels better than the desired confidence level (box 710). In the above example, if the desired confidence level is 8 then the query is decorated with confidence level 8, which is understood to represent confidence levels 8, 9, and 10. The decorated query then is sent to the custom Wordbreaker 235 for expansion (box 720). The custom Wordbreaker 235 expands the implied confidence levels (9 and 10 in the example) into explicit query terms in the OR form, such as confidence levels 8 OR 9 OR 10 (box 730).

It should be noted that the full-text lattice indexing and searching method uses the custom Wordbreaker 235 twice: once in indexing and once in searching. In this case the custom Wordbreaker 235 is called again, but for a different reason. The custom Wordbreaker 235 is used at this time to expand a word (say at confidence level 8) into OR forms (such as Level 8 OR 9 OR 10).

Conceptually, the OR function is true OR function, but in reality it is a little different. Stemming involves different word forms (such as "jump", "jumps", "jumping", "jumped"). In text indexing, it is desirable sometimes to consider all those forms of the word as the same word. Because of this, text full-text indexers have a function called stemmers. What stemmers do is reduce a word to its stem. Thus, "jumping" and "jumped" would be reduced to their stem word, "jump." When a user types "jumping" in the query, it would be mapped into "jump."

The problem is that this is quite simplistic. For example, "talk" can be a noun and a verb. In order to control this problem better, in practice full-text indexers index the word in the original form, without stemming on the indexing side. Instead, they expand the query on the search side and not on the indexing side. This means that every single index lookup is an implicit OR operation of the different forms of the same word. Full-text indexers are really good at performing these implicit OR operations. If this was implemented with a generic OR operator in SQL server, it would have a high cost in terms of performance. But this low-level implicit OR is intrinsic in the full-text indexer, and this is exploited by the full-text lattice indexing and searching system method.

IV.B.2. Custom Stemmer

Figure 8:
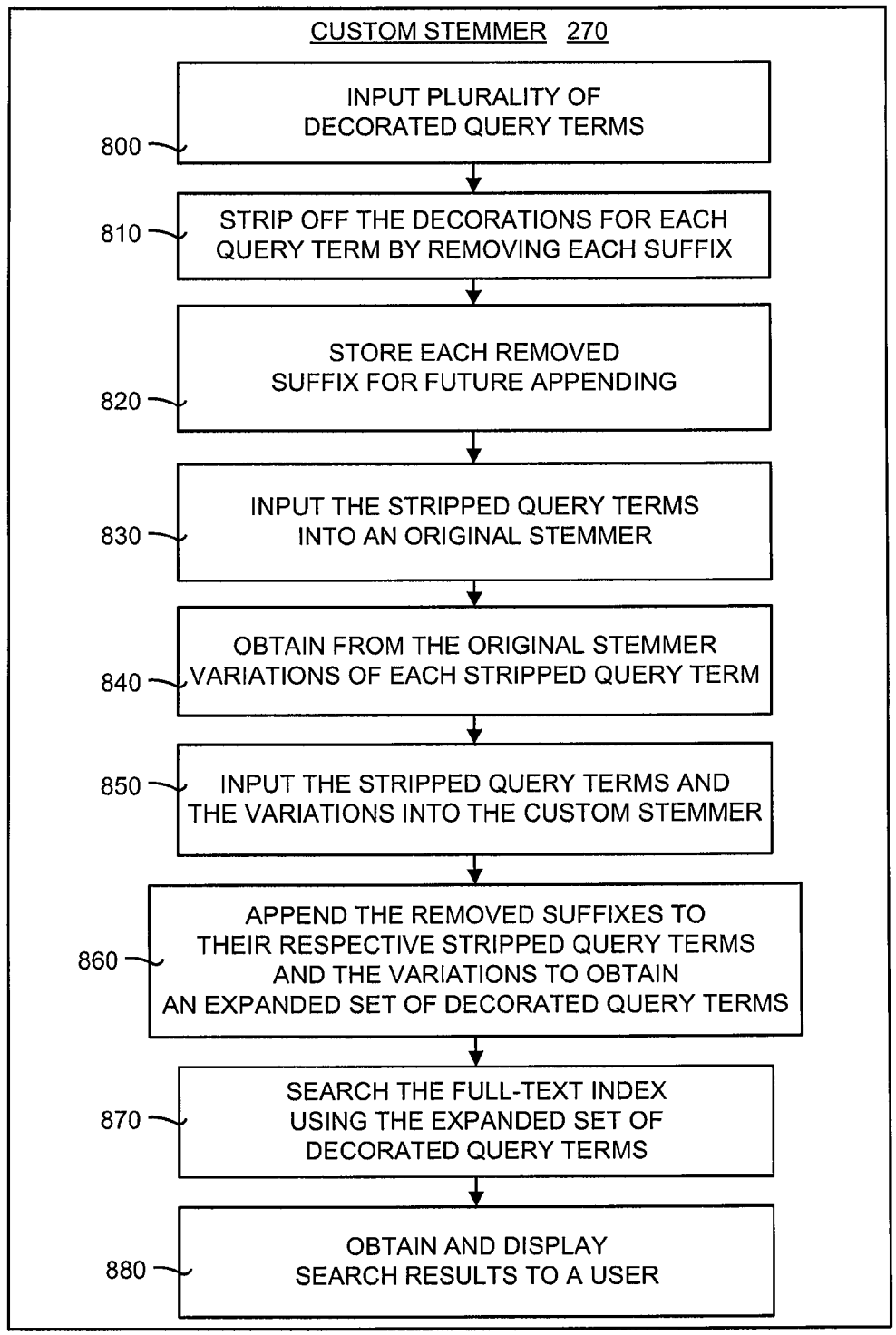
FIG. 8 is a detailed flow diagram illustrating the operation of the custom Stemmer shown in FIG. 2.

FIG. 8 is a detailed flow diagram illustrating the operation of the custom Stemmer 270 shown in FIG. 2. The custom Stemmer 270 prepares decorated queries for processing by the original Stemmer 275. If the strangely-decorated queries are sent directly to the original Stemmer 275 it will not understand them. The operation begins by inputting a plurality of decorated query terms (box 800). Next, the custom Stemmer 270 strips off the decorations for each of the query terms by removing each suffix (box 810). Theses removed suffixes are stored for future appending (box 820). This is because the full-text lattice indexing and searching method uses the custom Stemmer 270 to strip off the decorations and then calls the original Stemmer 275 to put the decorations back on.

In particular, the stripped query terms are input to the original Stemmer 275 (box 830). Variations of each stripped query term are obtained from the original Stemmer 275 (box 840). The stripped query terms and the variations then are input to the custom Stemmer 270 (box 850). The custom Stemmer 270 then appends the removed suffixes to their respective stripped query terms and to the variations to obtain an expanded set of decorated query terms (box 860). The full-text index 240 then can be searched using the expanded set of decorated query terms (box 870). The search results 250 then are obtained and displayed to the user (box 880).

By way of example and not limitation, assume a user inputs a query of "talk" at confidence level 8. The custom Wordbreaker 235 expands the query into confidence level 8 OR 9 OR 10. These decorated queries go into the custom Stemmer 270 and the Stemmer 270 is called 3 times (since there are 3 confidence levels 8, 9, and 10). For each of them, the custom Stemmer 275 strips off the decorations but remembers them. Then the original Stemmer 275 is called, which returns "talk", "talks", "talked", and "talking". Then the process goes back to the custom Stemmer 270 that puts back the decorations on all of those alternatives. What comes out is a set of decorated queries having 12 words instead of 3, since there are 4 alternatives multiplied by 3 confidence levels for each alternative. That is what is going into the full-text searcher 280. This yields quite a few words. The user only typed the query "talk", but now there are 12 different tokens. But, the text-indexer is made to efficiently handle these types of searches

IV.B.3. GenerateSnippets Function

As explained above, the searching pipeline starts with a query and then that query is expanded using the custom ExpandQuery function 255 and the custom Wordbreaker 235. The expanded query is processed using the custom Stemmer 270 and the original Stemmer 275. Then the full-text index 240 is searched, and the search results are given by the "document hits" and displayed to the user.

Figure 9:
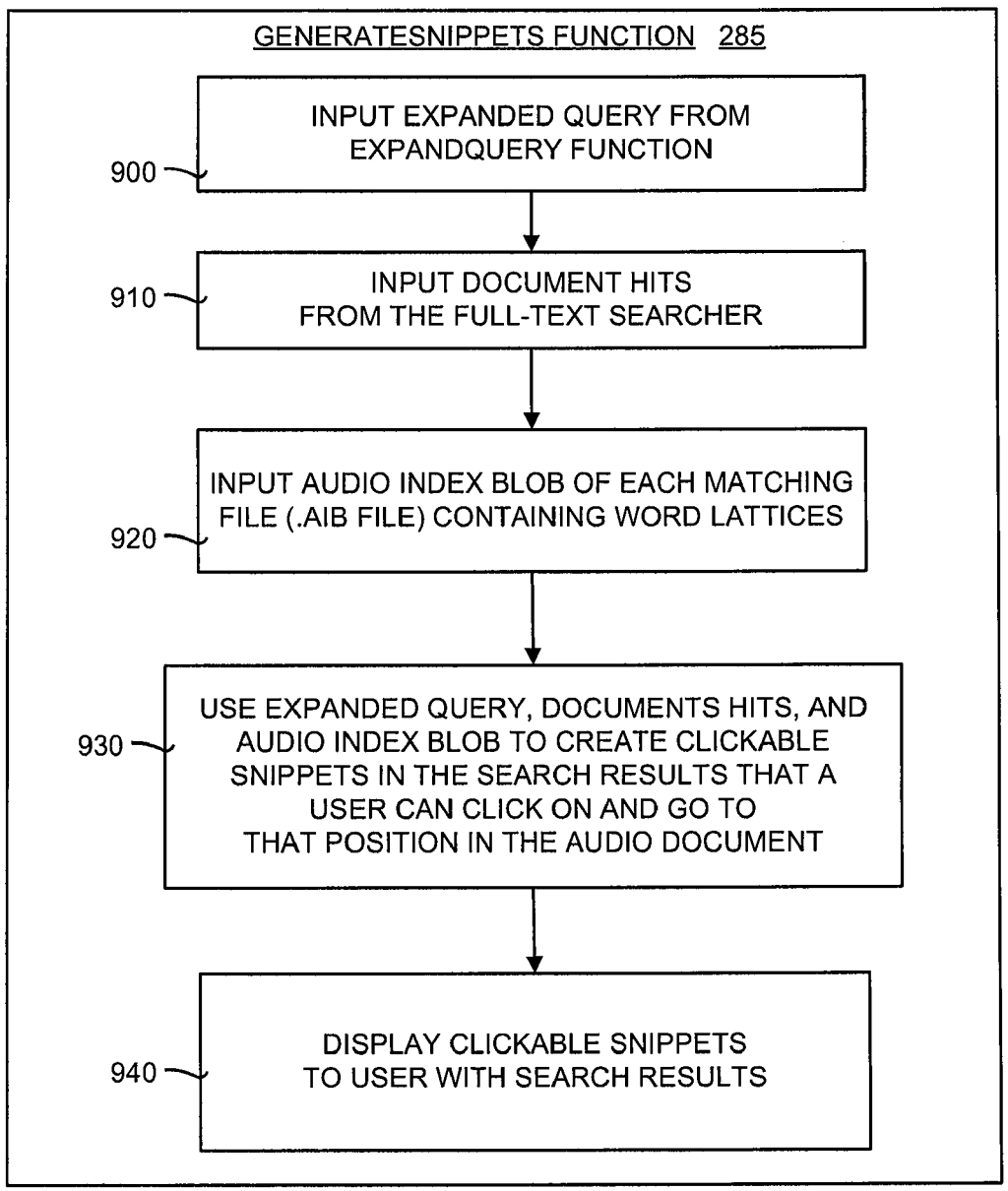
FIG. 9 is a detailed flow diagram illustrating the operation of the GenerateSnippets function shown in FIG. 2.

FIG. 9 is a detailed flow diagram illustrating the operation of the GenerateSnippets function 285 shown in FIG. 2. The GenerateSnippets function 285 computes relevance scores and creates snippets for the document hits and composes the search results 250. The operation of the GenerateSnippets function 285 begins by inputting the expanded query from the ExpandQuery function 255 (box 900). In addition, the document hits from the full-text searcher 280 are input (box 910). Also, the audio index blob of each matching file, represented as an .aib file, is input (box 920). The audio index blob contains the word lattices in a column structure or format. The blobs are necessary because they contains lattice and time information, which is necessary for the clickable snippets. The GenerateSnippets function 285 can also be used for reranking the search results 250.

Using the expanded query, the documents hits, and the audio index blob of each matching file, the GenerateSnippets function 285 creates clickable snippets in the search results 250 that a user can click on and go to that position in the audio document (box 930). This is achieved by generating a list of snippets with time information, which is displayed to the search UI user application 245. The rendering module 290 then renders this information as clickable snippets. These clickable snippets are displayed to a user in the search results 250 (box 940).

V. Alternate Embodiments

In FIG. 2 the speech recognition 215 is performed in the indexing workflow user application 200. In alternated embodiments, the audio content is stored directly in the full-text engine table 222. In these embodiments, the speech recognition module 215 is run directly in the custom IFilter 230. As shown in FIG. 2, there is the extra step of running the speech recognition 215 and outputting an audio binary blob. However, this alternate embodiment takes advantage of the fact that an audio file is also a binary blob and can be fed directly into the custom IFilter 230. Thus, in this alternate embodiment, the audio file is stored in the full-text engine table 222 and then is fed into the custom IFilter 230, which contains the speech recognition. Thus, the custom Index function 205 is called from within the custom IFilter 230.

This embodiment is useful for its ease of use. The audio file is stored and the searching can be performed automatically. However, this embodiment can be slow. Moreover, many enterprises have other things that they do to their audio files, such as record in one file format and then try to encode it into another file format.

Another alternate embodiment takes advantage of the fact that SQL server is extensible, meaning that function can be added to SQL server. In FIG. 2, before the search UI user application 245 is called from SQL, it has to call a function to do the decoration. And then when the decorated query comes back from SQL it has to do something on top of the result by calling another function. It is possible to hide that and have these two functions reside on SQL server. This makes the process even easier. The alternate embodiment users a new full-text search function that looks like the normal SQL function expect that is has a prefix. Specifically, the SQL function is called "Contains", and the new function is called "Speech-Contains".

In still other embodiments data mining functions are performed by plug-ins of the GenerateSnippets function 285. These data mining functions include trending of certain topics. For example, one year of new videos can be analyzed to determine when certain topics were hot. Then a plot over time can be generated to illustrate when the word "climate change" was frequently mentioned. The graph can be generated by using a word counting function in the GenerateSnippets function 285. Using standard SQL functions, this data can be turned into a graph.

Other embodiments also perform relevance ranking. This allows the search results 259 to be shown to a user in various ways. In one embodiment, the users is shown the most confident result. In another embodiment, the user is shown the most relevant result, which may or may not be the same as the most confident result. In all these embodiments the re-ranking is performed by the GenerateSnippets function 285.

Embodiments of the full-text lattice indexing and searching system and method described thus far use word decorations in the full-text index 240 to denote confidence levels, where the decorations are parsed by the GenerateSnippets function 285. Alternate embodiments of the full-text lattice indexing and searching system and method use the following technique. To transform a text indexer into a lattice indexer, "word position" must be changed to store start and end node (data structure change) and the phrase matcher must use that information (code change). The word posterior has to be stored (such as part of the supplementary "ranking information") and must be used by the ranker. Node times are needed only for the result display, and are not stored in the inverted index.

In this embodiment, having posteriors used by the ranker can be achieved by a novel technique. Typical indexer designs use the "ranking information" as an abstract type index into a weight table. To use posteriors in ranking, weight table needs to be changed accordingly. Thus, the remaining issue is phrase matching. If changes to the text indexer are not possible, then further approximations are needed to map nodes to word positions. This embodiment has the disadvantage that it still requires some change to the full-text search engine. Namely changes are required to the weight table.

VI. Exemplary Operating Environment

Embodiments of the full-text lattice indexing and searching system 100 and method are designed to operate in a computing environment. The following discussion is intended to provide a brief, general description of a suitable computing environment in which the full-text lattice indexing and searching system 100 and method may be implemented.

Figure 10:
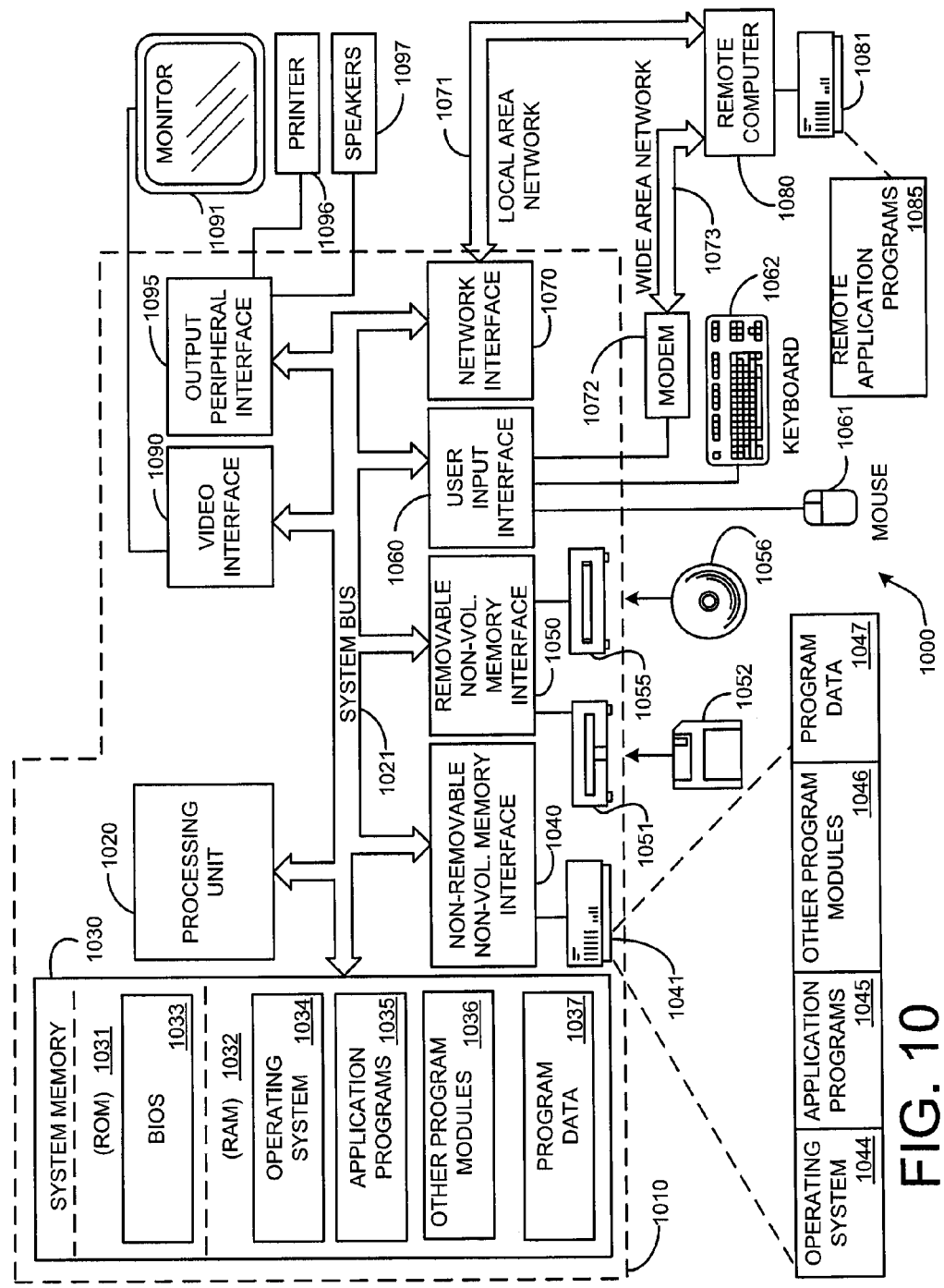
FIG. 10 illustrates an example of a suitable computing system environment in which the full-text lattice indexing and searching system 100 and method shown in FIGS. 1-9 may be implemented.

FIG. 10 illustrates an example of a suitable computing system environment in which the full-text lattice indexing and searching system 100 and method shown in FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

The full-text lattice indexing and searching system 100 and method is operational with numerous other general purpose or special purpose computing system environments or configurations. Examples of well known computing systems, environments, and/or configurations that may be suitable for use with the full-text lattice indexing and searching system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The full-text lattice indexing and searching system 100 and method may be described in the general context of computer-executable instructions, such as program modules, being executed by a computer. Generally, program modules include routines, programs, objects, components, data structures, etc., that perform particular tasks or implement particular abstract data types. The full-text lattice indexing and searching system 100 and method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for the full-text lattice indexing and searching system 100 and method includes a general-purpose computing device in the form of a computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1040 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for processing audio content, comprising:
    generating word lattices for the audio content, the word lattices containing a plurality of word candidates and nodes that represent connections between the word candidates and encoding times;
    expanding a decorated query that was decorated with desired confidence levels into a plurality of decorated queries corresponding to the desired confidence levels; and
    indexing the word lattices using a text indexer of a full-text search engine and the plurality of decorated queries such that the audio content is contained in a full-text index as indexed audio content.

2. A computer-implemented method for processing audio content, comprising:
    generating word lattices for the audio content, the word lattices containing a plurality of word candidates and nodes that are connections between the word candidates;
    inputting a query from a user containing at least one search term and a desired confidence level; and
    decorating the query with the desired confidence level and all confidence levels better than the desired confidence level to obtain a decorated query;
    expanding the decorated query into a plurality of decorated queries based on the desired confidence level; and
    obtaining search results corresponding to the decorated query and the desired confidence level and displaying the search results to the user.

3. A computer-implemented method for processing audio content, comprising:
    generating word lattices for the audio content, the word lattices containing a plurality of word candidates and nodes that are connections between the word candidates;
    indexing the word lattices using a text indexer of a full-text search engine such that the audio content is contained in a full-text index as indexed audio content;
    inputting a query from a user containing at least one search term and a desired confidence level;
    searching the indexed audio content to obtain search results corresponding to the query and the desired confidence level;
    decorating the query with the desired confidence level and all confidence levels better than the desired confidence level by appending to the search term a suffix corresponding to the desired confidence level and all confidence levels better than the desired confidence level to obtain a decorated query;
    inputting the decorated query into a Wordbreaker of the full-text search engine; and
    expanding the decorated query into a plurality of decorated queries corresponding whose number is equal to a sum of the desired confidence level plus a number of all confidence levels better than the desired confidence level.

4. The computer-implemented method of claim 1, further comprising binning the word lattice to organize each word lattice in columns containing the words candidates and associated confidence scores, each confidence score defined as a likelihood that the word candidate is a possible substitute for a query term.

5. The computer-implemented method of claim 1, further comprising:
    inputting a query from a user containing at least one search term and a desired confidence level; and
    searching the indexed audio content to obtain search results corresponding to the query and the desired confidence level.

6. The computer-implemented method of claim 2, further comprising:
    indexing the word lattices such that the audio content is contained in a full-text index as indexed audio content; and
    searching the indexed audio content to obtain the search results.

7. The computer-implemented method of claim 2, further comprising appending to the at least one search term a suffix corresponding to the desired confidence level and all confidence levels better than the desired confidence level.

8. The computer-implemented method of claim 2, further comprising:
    inputting the plurality of decorated queries into a custom Stemmer;
    stripping off the decorations of each of the plurality of decorated queries by removing each suffix to obtain stripped queries; and
    storing each suffix associated with each of the plurality of decorated queries for future appending.

9. The computer-implemented method of claim 2, further comprising binning the word lattice to organize each word lattice in columns containing the words candidates and associated confidence scores, each confidence score defined as a likelihood that the word candidate is a possible substitute for a query term.

10. The computer-implemented method of claim 3, further comprising:
  inputting the plurality of decorated queries into a custom Stemmer; and
  stripping off the decorations of each of the plurality of decorated queries by removing each suffix to obtain stripped queries; and
  storing each suffix associated with each of the plurality of decorated queries for future appending.

11. The computer-implemented method of claim 4, further comprising:
  quantizing a plurality of confidence scores into a discrete number of confidence scores; and
  decorating a word candidate with a confidence score by appending to the word candidate a suffix corresponding to that confidence score.

12. The computer-implemented method of claim 5, further comprising decorating the query with the desired confidence level and all confidence levels better than the desired confidence level by appending to the search term a suffix corresponding to the desired confidence level and all confidence levels better than the desired confidence level to obtain a decorated query.

13. The computer-implemented method of claim 8, further comprising:
  inputting the stripped queries into an original Stemmer of the full-text search engine;
  obtaining from the original Stemmer variations of each of the stripped queries to obtain query variations;
  inputting the stripped queries and the query variations into the custom Stemmer;
  appending the removed suffixes to their proper stripped queries and the query variations to obtain an expanded set of decorated queries; and
  searching the full-text index using the expanded set of decorated queries.

14. The computer-implemented method of claim 9, further comprising:
  quantizing a plurality of confidence scores into a discrete number of confidence scores; and
  decorating a word candidate with a confidence score by appending to the word candidate a suffix corresponding to that confidence score.

15. The computer-implemented method of claim 10, further comprising:
  inputting the stripped queries into an original Stemmer of the full-text search engine;
  obtaining from the original Stemmer variations of each of the stripped queries to obtain query variations;
  inputting the stripped queries and the query variations into the custom Stemmer;
  appending the removed suffixes to their proper stripped queries and the query variations to obtain an expanded set of decorated queries; and
  searching the full-text index using the expanded set of decorated queries.

16. The computer-implemented method of claim 11, further comprising:
  encoding each word lattice column as a single linear text string by concatenating each word in the column with a separation character; and
  outputting the single linear text string from a text ingestion plug-in of the full-text search engine.

17. The computer-implemented method of claim 12, further comprising:
  inputting the decorated query into a Wordbreaker of the full-text search engine; and
  expanding the decorated query into a plurality of decorated queries corresponding whose number is equal to a sum of the desired confidence level plus a number of all confidence levels better than the desired confidence level.

18. The computer-implemented method of claim 16, further comprising:
  inputting the single linear text string to a Wordbreaker of the full-text search engine;
  decoding the single linear text string to recover the word lattice columns and associated confidence scores; and
  storing the word lattice columns and associated confidence scores in the full-text index.

19. The computer-implemented method of claim 17, further comprising:
  inputting the plurality of decorated queries into a custom Stemmer;
  stripping off the decorations of each of the plurality of decorated queries by removing each suffix to obtain stripped queries; and
  storing each suffix associated with each of the plurality of decorated queries for future appending.

20. The computer-implemented method of claim 19, further comprising:
  inputting the stripped queries into an original Stemmer of the full-text search engine;
  obtaining from the original Stemmer variations of each of the stripped queries to obtain query variations;
  inputting the stripped queries and the query variations into the custom Stemmer;
  appending the removed suffixes to their proper stripped queries and the query variations to obtain an expanded set of decorated queries; and
  searching the full-text index using the expanded set of decorated queries.

* * * * *